July 31, 1956 — E. BERGER — 2,756,541

CONTAINER FOR GROWING STRAWBERRY PLANTS

Filed Aug. 7, 1952

INVENTOR
EDWARD BERGER
BY
Curtis, Morris & Safford.
ATTORNEYS

United States Patent Office 2,756,541
Patented July 31, 1956

2,756,541

CONTAINER FOR GROWING STRAWBERRY PLANTS

Edward Berger, Mount Kisco, N. Y.

Application August 7, 1952, Serial No. 303,140

2 Claims. (Cl. 47—34)

This invention relates to containers for growing plants and in particular, to a lattice type framework having spaced openings in its sides for growing strawberries or other plants.

Strawberry barrels have been made by drilling holes in the sides of a large barrel, filling the barrel with soil, and planting strawberry plants in the soil so that they protrude and grow outwardly through the side openings. It has also been known to use various barrel-shaped receptacles of clay or similar material having side openings for the purpose of growing vines, strawberry plants, or the like.

Strawberry barrels permit a relatively large number of strawberry plants to be grown in a limited amount of space and eliminate the need for cultivation and weeding. However, it is sometimes difficult to obtain wooden barrels and it is a time-consuming and tedious task to drill the necessary openings. Moreover, the bottom portion of the sides of the barrel slopes inwardly so that the dirt within the barrel tends to fall out through the openings. Another serious disadvantage in the earlier structures is that they could not be stored and shipped readily. That is, barrels or ceramic or clay casks are heavy and require a large amount of space for storage and for shipping so that handling is expensive.

In accordance with the present invention, a plant container is provided that is easily and economically manufactured, can be stored and shipped in a minimum amount of space, and which is better suited for the cultivation of strawberries and other plants than the structures heretofore proposed.

The foregoing and other objects, aspects, and advantages of the present invention will be in part apparent from and in part pointed out in the following description of the preferred embodiment of the invention considered in conjunction with the accompanying drawings, in which.

Figure 1:
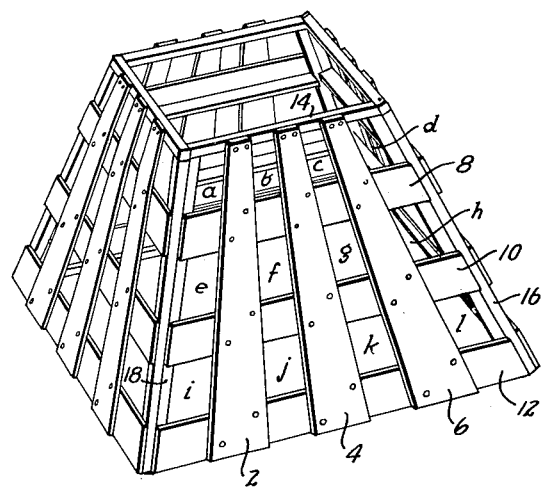
Figure 1 is a perspective view of the outer form of the container.

As shown in Figure 1, the container comprises a four-sided box-like structure, each of the upright sides of which comprises a lattice work formed of three upwardly-extending wooden members 2, 4, and 6, and three cross members 8, 10, and 12. The upright members 2, 4, and 6 may be tapered so that they are wider at the bottom than at the top, or they may be of uniform width. The upper ends of the members 2, 4, and 6 are secured to a top horizontal frame member 14 and the ends of the cross members 8, 10, and 12 are secured to upright corner members 16 and 18. These crossed members form openings indicated at a, b, c, . . . k and l, for the plants.

The other three sides of the container preferably are formed identically with the one just described so as to facilitate mass production, but it is obvious that there is no necessity for such symmetrical construction.

Each side of the container slopes inwardly toward its upper end so that the container is substantially larger in horizontal cross-sectional area at the bottom than at the top. This sloping construction tends to hold the soil within the container so that it does not fall out through the openings formed between the members of the lattice work.

Figure 3:
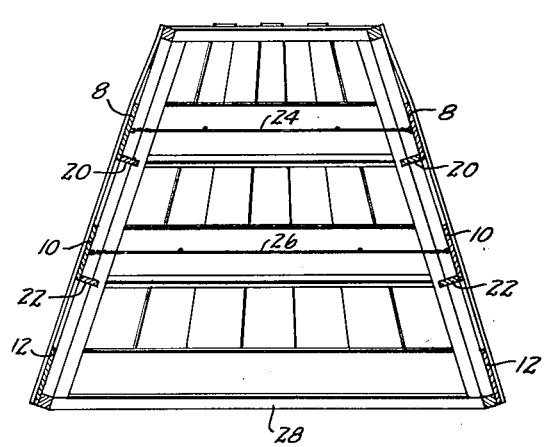
Figure 3 is a vertical sectional view of the structure of Figure 1.

In order to further retard any tendency of the soil to fall out through the openings, each of the cross members 8 and 10 is provided, respectively, with a narrow, inwardly-extending shelf as at 20 and 22 in Figure 3. These shelves or inwardly-extending projections are effective in preventing the soil from falling out of the openings immediately below the shelf.

In order that the lattice work which forms the container may be of light construction and still not bulge outwardly under the pressure of the soil within the container, a number of guy wires as indicated at 24 and 26 in Figure 3 may be stretched between opposite sides of the container. Thus, a wire 24 extends between the cross pieces 8 on opposite sides of the container. The number of such internal support members will depend upon the weight of the lumber or other material of which the container is constructed.

The container is provided with a bottom 28 which may be formed of wood and may be solid or may have a number of perforations therein.

Figure 2:
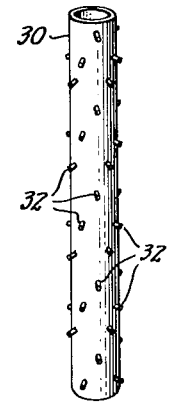
Figure 2 is a perspective view of a watering pipe which, in use, is positioned vertically within the structure shown in Figure 1.

In order to provide water for the plants, a pipe 30 in Figure 2 is positioned vertically within the container of Figure 1 and extends up through the center to the top or above the top of the container. The pipe 30 may be formed of sheet aluminum or other suitable material and is provided with a number of perforations so that the pipe can be filled with water which will flow outwardly through the perforations into the soil. In order to reduce the rate of transfer of water from the pipe 30 to the soil, each of the perforations is plugged by a wick 32 of hemp, asbestos, cotton or other suitable material.

In use, the bottom two or three inches of the container may be filled with porous material such as stones, crushed shells, gravel, or the like and the remainder of the container filled with soil loosely packed around the central watering pipe 30. The strawberry plants may be placed in any of the openings a, b, c, . . . j, k, l, either after the barrel is filled with the soil, or at each level as the barrel is being filled with soil.

It will be apparent that the construction may be modified so as to accommodate any desired number of plants and that this will depend to a considerable extent upon the type and kind of plants to be grown as well as upon the size of the container. Ordinarily, for strawberries, it is most convenient for the container to have approximately forty-eight openings. Such a container may be built with an over-all height of about three feet, and with a base approximately three feet on each side.

Figure 4:
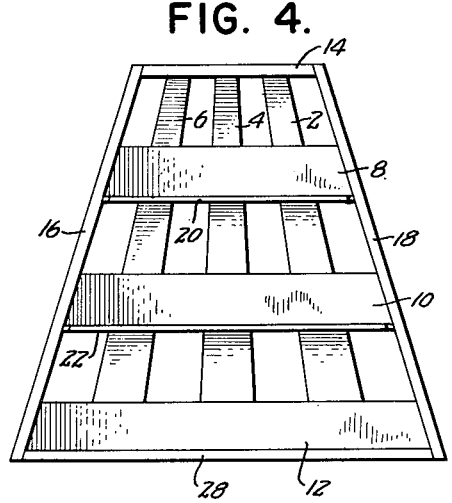
Figure 4 is an elevational view of the inside of one of the four sides of the structure of Figure 1 prior to assembling showing the form in which the sides are shipped.

In use, the four sides of the container may be fabricated separately as shown in Figure 4 and packed in face-to-face relationship in a shipping container, together with the other necessary parts. In this form, the containers occupy little space and are conveniently handled and shipped. The ultimate user or the retail purchaser can then rapidly assemble the container by merely nailing the necessary pieces together. The container is most easily and economically fabricated from wood but other material can be used if desired.

From the foregoing, it will be seen that I have provided a plant container that is well adapted to obtain the ends and objects hereinbefore set forth and to be economically manufactured and conveniently handled and shipped. It is apparent that various modifications of the structure herein set forth can be made without departing from the spirit and scope of the present invention, and that the scope of the invention is to be measured by the following claims interpreted in light of the earlier developments.

I claim:

1. A container for growing strawberry plants including four planar sides, sloping upwardly and inwardly from the bottom to the top and being formed of spaced cross members arranged in a lattice work providing horizontal rows of spaced openings between the said members, means joining the adjacent edge portions of said sides, and a plurality of inwardly-extending soil-retaining shelves each secured to one of said members and being positioned immediately above one of the horizontal rows of openings.

2. Apparatus as claimed in claim 1 including a plurality of guy wires extending across the interior of said container between opposite sides.

References Cited in the file of this patent

UNITED STATES PATENTS

| 197,406 | Reinecke | Nov. 20, 1877 |
| 1,217,239 | Swartz | Feb. 27, 1917 |
| 1,268,649 | Velde | June 4, 1918 |
| 1,752,597 | Jackson | Apr. 1, 1930 |

FOREIGN PATENTS

| 109,183 | Austria | Mar. 26, 1928 |